United States Patent
Du (10) Patent No.: US 10,268,265 B2
(45) Date of Patent: Apr. 23, 2019

(54) INFORMATION PROCESSING METHOD, INFORMATION PROCESSING APPARATUS AND USER EQUIPMENT

(71) Applicant: Beijing Zhigu Rui Tuo Tech Co., Ltd, Beijing (CN)

(72) Inventor: Lin Du, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 27 days.

(21) Appl. No.: 15/170,140

(22) Filed: Jun. 1, 2016

(65) Prior Publication Data

US 2016/0358023 A1    Dec. 8, 2016

(30) Foreign Application Priority Data

Jun. 4, 2015   (CN) .......................... 2015 1 0303129

(51) Int. Cl.
   *G06K 9/00*   (2006.01)
   *G06F 3/01*   (2006.01)
(52) U.S. Cl.
   CPC .................................. *G06F 3/013* (2013.01)
(58) Field of Classification Search
   CPC ..................................................... G06F 3/013
   USPC ......................................................... 382/103
   See application file for complete search history.

(56) References Cited

U.S. PATENT DOCUMENTS

| 2003/0160736 A1 | 8/2003 | Faso et al. |
| 2007/0014552 A1 | 1/2007 | Ebisawa |
| 2008/0247663 A1 | 10/2008 | Jacobsen |
| 2010/0315415 A1 | 12/2010 | Asami |
| 2011/0169730 A1 | 7/2011 | Sugihara |
| 2013/0293466 A1 | 11/2013 | Shibata |

(Continued)

FOREIGN PATENT DOCUMENTS

| CN | 103431840 A | * 12/2013 | ........... A61B 3/0025 |
| CN | 103475893 A | 12/2013 | |

(Continued)

OTHER PUBLICATIONS

Non-Final Office Action from U.S. Appl. No. 15/170,105, dated Aug. 11, 2017, 16 pages.

(Continued)

*Primary Examiner* — Gregory F Cunningham
(74) *Attorney, Agent, or Firm* — Amin, Turocy & Watson, LLP (57) ABSTRACT

An information processing method, an information processing apparatus and a user equipment are provided. A method comprises: acquiring sight line information of at least one user in a space; and in response to a determination according to the sight line information that at least one set sight line direction exists, generating an operation instruction; wherein each set sight line direction in the at least one set sight line direction has a first gaze point and a second gaze point distributed front and back, and two starting points of two sight lines respectively corresponding to the first gaze point and the second gaze point are both before the first gaze point. Accordingly, it is easily detected according to at least one user's sight line information that a transparent object or a mirror object exists in a space, facilitating the user or a device to use the object detection result for subsequent operations.

27 Claims, 8 Drawing Sheets

(56) References Cited

U.S. PATENT DOCUMENTS

| | | | |
|---|---|---|---|
| 2013/0293488 A1* | 11/2013 | Na | ................ G06F 3/013 |
| | | | 345/173 |
| 2014/0043229 A1 | 2/2014 | Higaki | |
| 2014/0139453 A1 | 5/2014 | Yu et al. | |
| 2015/0073596 A1 | 3/2015 | Fudaba et al. | |
| 2015/0091794 A1* | 4/2015 | Ha | ................ G06F 3/013 |
| | | | 345/156 |
| 2015/0227197 A1 | 8/2015 | Nomura et al. | |
| 2016/0135675 A1 | 5/2016 | Du et al. | |
| 2016/0280136 A1 | 9/2016 | Besson | |

FOREIGN PATENT DOCUMENTS

| | | | | |
|---|---|---|---|---|
| CN | 106475893 A | * | 12/2013 | |
| CN | 104156069 A | * | 11/2014 | |
| CN | 104182043 A | | 12/2014 | |
| JP | WO-2005077258 A1 | * | 8/2005 | ............ G01B 11/00 |
| WO | 2005077258 A1 | | 8/2005 | |
| WO | WO 2013033170 A3 | | 5/2013 | |

OTHER PUBLICATIONS

Non-Final Office Action from U.S. Appl. No. 15/170,076, dated Nov. 17, 2017, 21 pages.

Non-Final Office Action dated Apr. 05, 2018 for U.S. Appl. No. 15/910,105, 20 pages.

Chinese Office action dated Aug. 24, 2018 for Chinese Application No. 201510303129.4, 5 pages.

Chinese Office Action for Chinese Application Serial No. 201510303145.3 dated Jun. 28, 2018, 12 pages. (with translation).

Office Action dated Sep. 28, 2018 for U.S. Appl. No. 15/910,105, 35 pages.

\* cited by examiner

INFORMATION PROCESSING METHOD, INFORMATION PROCESSING APPARATUS AND USER EQUIPMENT

RELATED APPLICATION

The present application claims the benefit of priority to Chinese Patent Application No. 201510303129.4, filed on Jun. 4, 2015, and entitled "Information Processing Method, Information Processing Apparatus and User Equipment", which application is hereby incorporated into the present application by reference herein in its entirety.

TECHNICAL FIELD

The present application relates to the field of information processing technologies, and, for example, to an information processing method, an information processing apparatus and a user equipment.

BACKGROUND

A transparent object or mirror object existing in a space may bring about difficulties to automatic detection on objects of the space, causing some smart devices to have problems in use. For example, in some possible scenarios, some optics-based object detection device may not detect existence of the transparent object or mirror object, and thus consider that no object exists in the position of the transparent object or mirror object, wherein, for the mirror object, it is also likely to consider that an image of an object in the mirror object is a real object. In this way, when subsequent operations are performed based on detection results of the object detection devices, problems may arise, for example, a user or device is guided to omit the transparent object or the mirror object and reach the position after the transparent object or the position of the image in the mirror object.

SUMMARY

A possible objective of example embodiments of the present application is to provide an information processing solution.

In a first aspect, an example embodiment of the present application provides an information processing method, comprising:

acquiring sight line information of at least one user in a space; and in response to a determination according to the sight line information that at least one set sight line direction exists, generating an operation instruction;

wherein each set sight line direction in the at least one set sight line direction has a first gaze point and a second gaze point distributed front and back, and two starting points of two sight lines respectively corresponding to the first gaze point and the second gaze point are both before the first gaze point.

In a second aspect, an example embodiment of the present application provides an information processing apparatus, comprising:

an information acquisition module, configured to acquire sight line information of at least one user in a space; and an instruction generation module, configured to, in response to a determination according to the sight line information that at least one set sight line direction exists, generate an operation instruction;

wherein each set sight line direction in the at least one set sight line direction has a first gaze point and a second gaze point distributed front and back, and two starting points of two sight lines respectively corresponding to the first gaze point and the second gaze point are both before the first gaze point.

In a third aspect, an example embodiment of the present application provides a user equipment, the user equipment comprising:

a memory, configured to store an instruction;

a processor, configured to execute the instruction stored in the memory, the instruction causing the processor to execute the following operations of:

acquiring sight line information of at least one user in a space; and in response to a determination according to the sight line information that at least one set sight line direction exists, generating an operation instruction;

wherein each set sight line direction in the at least one set sight line direction has a first gaze point and a second gaze point distributed front and back, and two starting points of two sight lines respectively corresponding to the first gaze point and the second gaze point are both before the first gaze point.

In at least one of the example embodiments of the present application, it is easily detected according to at least one user's sight line information that a transparent object or a mirror object exists in a space, facilitating a user or a device to use the object detection result for subsequent operations, for example, it is possible to avoid hitting the transparent object or mirror object.

DETAILED DESCRIPTION

Example embodiments of the present application are further described below in detail with reference to the accompanying drawings (in which like elements are denoted by like reference numerals) and embodiments. The following embodiments are used for describing the present application, but are not intended to limit the scope of the present application.

A person skilled in the art may understand that the terms such as "first" and "second" in the present application are used only to differentiate different steps, devices, modules, or the like, and neither represent any specific technical meaning, nor indicate any necessary logical relationship between the terms.

Figure 1:
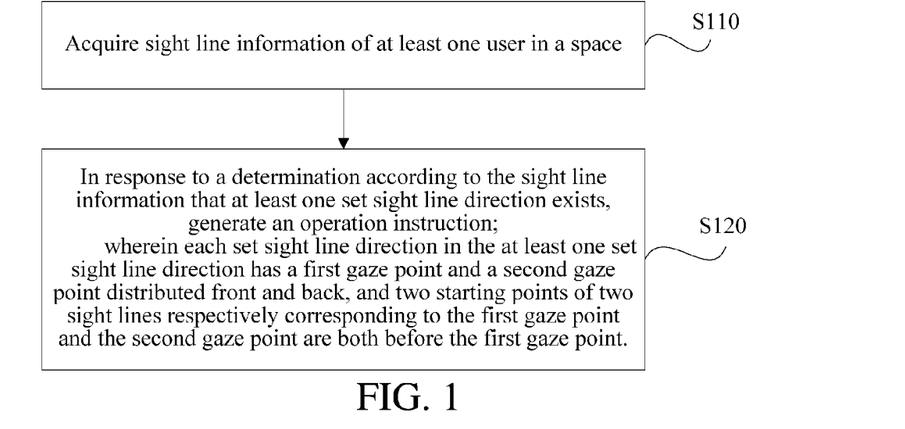
FIG. 1 is a flowchart of an information processing method according to an example embodiment of the present application.

As shown in FIG. 1, an embodiment of the present application provides an information processing method, comprising:

S110 acquiring sight line information of at least one user in a space; and

S120 in response to a determination according to the sight line information that at least one set sight line direction exists, generating an operation instruction; wherein each set sight line direction in the at least one set sight line direction has a first gaze point and a second gaze point distributed front and back, and two starting points of two sight lines respectively corresponding to the first gaze point and the second gaze point are both before the first gaze point.

When a user watches a transparent object or mirror object in a space, sight lines in one direction may fall on the object itself and may also fall behind the object. For the transparent object, the sight lines may fall on an object behind the transparent object, and for the mirror object, the sight lines may fall on an image of an object that a mirror plane of the mirror object faces. Therefore, by determining existence of such sight lines in the space, it is feasible to determine the transparent object or mirror object existing in the space, thus generating a corresponding operation instruction.

For example, an information processing apparatus provided in the present application is used as an execution body of this embodiment, to execute S110-S120. Specifically, the information processing apparatus may be disposed in a user equipment in a manner of software, hardware, or a combination of software and hardware, or the information processing apparatus itself is the user equipment; the user equipment comprises, but is not limited to: a computer, a notebook, a tablet computer, a smartphone, smart glasses, a smart helmet and an intelligent robot. The intelligent robot, for example, may be a robot that can automatically move, for example, a Roomba or the like.

In the above example embodiment of the present application, it is easily detected according to at least one user's sight line information that a transparent object or a mirror object exists in a space, facilitating the user or a device to use the object detection result for subsequent operations, for example, it is possible to avoid hitting the transparent object or mirror object.

Each step of the embodiment of the present application is further described through the following example embodiment:

S110 Acquire sight line information of at least one user in a space.

In some example embodiments, the sight line information comprises:

direction information, starting point position information and gaze point position information of multiple sight lines of the at least one user in the space.

A person skilled in the art can know that, as sight lines of the user cannot focus on the air with no objects, each sight line of the user may correspond to an object. When a user watches an object, the position of one eye of the user is a starting point position of a sight line corresponding to the eye, the position on the object watched by the user is the gaze point position of the sight line, and the direction watched by the eye is the direction of the sight line. In the embodiment of the present application, the direction of a sight line is the direction having a spatial position, for example, in the embodiment of the present application, other sight line directions parallel to but not coinciding with one sight line direction are considered to be sight line directions different from the sight line direction, or according to requirements of precision, it is feasible to set other sight line directions parallel to one sight line direction but having a distance outside a set error range, which are considered to be sight line directions different from the sight line direction.

In the embodiment of the present application, the at least one user may be one user, and may also be multiple users.

For example, in one example embodiment, optionally, the multiple sight lines may be:

multiple sight lines corresponding to objects existing in the space watched by a user multiple times in the space after one or more periods of time.

Alternatively, in one example embodiment, the multiple sight lines may be:

multiple sight lines corresponding to objects existing in the space watched by multiple users multiple times in the space after one or more periods of time.

In the embodiment of the present application, the more the number of the sight lines corresponding to the sight line information is, and the more evenly the sight lines are distributed, positions, shapes and the like of the objects existing in the space can be determined more accurately. In some example embodiments, as time goes on, the number of sight lines of the at least one user in the space may increase constantly, and thus the sight line information can be updated according to a set regularity. For example, the sight line information is updated constantly with a set cycle. In some example embodiments, an established model of the objects can be improved constantly through sight line information corresponding to new sight lines.

In one example embodiment, the multiple sight lines may be captured when the at least one user watches each object in the space unconsciously. Alternatively, in one example embodiment, it is also feasible to indicate the at least one user to intentionally watch the corresponding object (for example, indicate the at least one user to watch the mirror object or transparent object existing in the space), thus acquiring corresponding sight line information.

In some possible application scenarios, gaze point positions of one or more sight lines of the at least one user are not on a fixed object, for example, a moving object may appear in the space, the at least one user may watch the moving object, and thus in the embodiment of the present application, in order to avoid noise brought about by noise sight lines from which such an object is watched, it is feasible to exclude the noise sight lines first.

As presence of the moving object may be random or intermittent in the time, it is feasible to determine such noise sight lines according to acquisition time information of the multiple sight lines, for example, if sight lines of a gaze point in the region only appear in a region of the space in one time period, such sight lines may be the noise sight lines. Therefore, in one example embodiment, the sight line information further comprises:

acquisition time information of the multiple sight lines.

In one example embodiment, before the determining, at least according to the sight line information, at least one mirror object, the method further comprises:

excluding, according to the acquisition time information, at least one noise sight line in the multiple sight lines.

In one example embodiment, S110 may acquire the sight line information from at least one external device. For example, in one example embodiment, it is feasible to acquire the sight line information from a data server; or, in one example embodiment, it is feasible to acquire the sight line information from at least one sight line tracking device of the at least one user and at least one locating apparatus.

The at least one sight line tracking device, for example, may be: a sight line tracking device that respectively tracks sight line directions of two eyes of a user to determine the position of a gaze point relative to the user according to the sight line directions of the two eyes. Alternatively, the sight line tracking device may also be: a sight line tracking device that tracks a sight line direction of one eye of a user and focal length information of the eye, to obtain the position of a gaze point relative to the user according to the sight line direction and the focal length information.

The at least one locating apparatus may be configured to acquire position information of the at least one user in the space, thus obtaining starting point position information corresponding to the sight line.

In one example embodiment, for example, the at least one user is one user, at this point, the information processing apparatus, for example, may be a headset device of the user, the headset device may capture sight line information of the user, and at this point, S110, for example, may be capturing the sight line information.

S120 In response to a determination according to the sight line information that at least one set sight line direction exists, generate an operation instruction.

Each set sight line direction in the at least one set sight line direction has a first gaze point and a second gaze point distributed front and back, and two starting points of two sight lines respectively corresponding to the first gaze point and the second gaze point are both before the first gaze point.

In one example embodiment, the determination according to the sight line information that at least one set sight line direction exists, for example, may comprise:

determining, according to the sight line information, at least one set of sight lines, wherein each set of sight lines comprise two sight lines in the same sight line direction, gaze points of the two sight lines are distributed front and back, and starting points of the two sight lines are both in front of the gaze points; and a sight line direction corresponding to each set of sight lines is a set sight line direction.

In one example embodiment, only when two sight line directions of two sight lines are both completely the same as the sight line direction, can the first gaze point and the second gaze point be considered to be distributed front and back in the sight line direction; in other example embodiments, according to different precision requirements, it is also feasible to consider that the two sight line directions are the same as the sight line direction when the difference between the two sight line directions of the two sight lines and the sight line direction is within the set range, that is, the first gaze point and the second gaze point are in the sight line direction.

In the embodiment of the present application, front and back are relative to the sight line direction, for example, an upstream position in the sight line direction is before a downstream position in the sight line direction. In the embodiment of the present application, in the corresponding set sight line direction, the first gaze point is upstream of the second gaze point.

In one possible application scenario, in one sight line direction, one sight line may be in a front side of an object, and a corresponding gaze point position thereof is on the object; the other sight line may be in a back side of the object, and a corresponding gaze point position thereof is on another object behind the object. At this point, although the object may not be a mirror object or transparent object, a first gaze point and a second gaze point distributed front and back may still be present in the sight line direction. Therefore, in the embodiment of the present application, in order to exclude such a situation and improve accuracy of determination of the mirror object, it is required that two sight line starting points of two sight lines respectively comprising the first gaze point and the second gaze point are both before the first gaze point. In this way, when an object is an ordinary object (for example, the object is neither a transparent object nor a mirror object), as the user's sight line cannot penetrate the object to reach the back side of the object, the situation may not occur where the starting point is in a front side of a gaze point in the sight line direction and the gaze point is a sight line in a rear side of the gaze point.

In one possible application scenario, when the first gaze point and the second gaze point distributed front and back are in a sight line direction and starting points of the two sight lines are both before the first gaze point, it indicates that the sight line direction has a mirror object or a transparent object, and a corresponding operation can be performed according to such a set sight line direction. For example, when it is determined that the at least one set sight line direction exists, a warning instruction that warns a user or device is generated.

In one example embodiment, in response to a determination according to the sight line information that at least one set sight line direction exists, the generating an operation instruction comprises:

in response to a determination according to the sight line information that the at least one set sight line direction exists, determining that there is at least one set object existing in the at least one set sight line direction; and generating the operation instruction corresponding to the at least one set object;

wherein the at least one set object comprises: at least one transparent object and/or at least one mirror object.

Different from the previous example embodiment, in the example embodiment, after it is determined that the at least one set sight line direction exists, a step of determining that the at least one set object is existing in the at least one set sight line direction is added. When the at least one set sight line direction is a set sight line direction, it is possible to determine that in the set sight line direction there is a set object. When the at least one set sight line direction is multiple set sight line directions, the multiple set sight line directions may be sight line directions in which the same set object is gazed; and may also be sight line directions in which multiple set objects are gazed.

In the example embodiment, once a set sight line direction exists in the space, a set object may exist in the space; however, it is impossible to determine according to the set sight line direction that the set object is a transparent object or a mirror object. In the embodiment of the present application, it is not necessary to distinguish whether the set object is the transparent object or the mirror object; in other example embodiments, if it is necessary to make a distinction between them, it is feasible to make a further distinction according to other means. For example, whether a second gaze point in a set sight line direction matches an object surface is determined, if yes, it indicates that the set object is a transparent object; if no, it indicates that the set object is a mirror object; or whether a mirror point of the second gaze point relative to the surface of the set object matches an object surface is determined, if yes, it indicates that the set object is a mirror object; if no, it indicates that the set object is transparent object. The matching between a point and an object surface, for example, may be that a position difference between the point and the object surface is within a set deviation range.

In some possible application scenarios, it is only necessary to know that a sight line direction has the set object, but it is unnecessary to know the position of the set object. For example, in one application scenario, after a sight line direction is determined, it is only necessary to warn the user, notify the user that the sight line direction has the set object, and remind the user to pay attention thereto.

In some other possible application scenarios, it may be necessary to further determine the position of the at least one set object, for example, the user or device is reminded how far from the current direction there is a set object, to facilitate the user or device to make preparations in advance. In the embodiment of the present application, as the at least one first gaze point is a gaze point from which the at least one set object is gazed, in one example embodiment, the determining that there is at least one set object existing in the at least one set sight line direction may comprise:

determining that the at least one set object exists in the position of at least one first gaze point corresponding to the at least one set sight line direction.

In one example embodiment, further, it is also feasible to determine, according to the sight line information, at least one region where the at least one set object is. Herein, the at least one region where the at least one set object is may comprise a boundary range of the at least one set object; in addition, may also comprise the shape of a surface of the at least one set object gazed by the user. In this way, it is feasible to provide more accurate information of the at least one set object for the user or device. For example, it is feasible to provide more information for modeling of the at least one set object. At this point, in the example embodiment, the method may further comprise:

determining, according to position distribution regularities of the at least one first gaze point, at least one region where the at least one set object is.

In the example embodiment, the at least one first gaze point in the at least one set sight line direction correspondingly falls on the at least one set object, and thus it is feasible to determine, according to the position of the at least one first gaze point, the at least one region where the at least one set object is.

In one example embodiment, it is feasible to segment the all first gaze points with a spatial point segmentation method and find multiple sets of the at least one first gaze point, each set corresponding to a region of a set object in the at least one set object. For example, the all first gaze points are converted to point cloud, each first gaze point is a corresponding point in the point cloud, and then points corresponding to different set objects are distinguished with a point cloud segmentation method; a region corresponding to a set object is obtained according to the point cloud corresponding to the set object with a surface reconstruction method, for example, a Poisson surface reconstruction method. Definitely, other possible surface reconstruction methods may also be applied to the embodiment of the present application.

A person skilled in the art can know that the more the number of the at least one set sight line direction is, the more even the distribution is, and the at least one region of the at least one set object is determined more accurately.

In one example embodiment, optionally, the operation instruction may comprise:

a warning instruction.

The warning instruction is an instruction configured to notify the user or device that a set sight line direction has the set object.

For a warning instruction notifying one user by the user, it may be one or more of a sound warning instruction, a graph and text display warning instruction, an indicator warning instruction and other warning instructions.

In one example embodiment, the method further comprises:

executing an operation according to the warning instruction.

For example, corresponding to the sound warning instruction, the graph and text display warning instruction, the indicator warning instruction, make a warning sound, display a warning graph and text and light a corresponding indicator.

Alternatively, in one example embodiment, it is also feasible to control motion characteristics of a moving device according to the warning information, for example, the device is controlled to slow down, stop, turn or turn around in a position (for example, the position where the set object is).

In another example embodiment, optionally, the operation instruction may comprise:

a modeling instruction.

The modeling instruction is an instruction configured to model the set object in the space in a virtual space corresponding to the space.

In one example embodiment, the method further comprises:

executing a modeling operation corresponding to the at least one set object according to the modeling instruction.

For example, the position, shape, characteristics and the like of the at least one set object in the virtual space are determined.

In addition to the above operation instructions, the operation instruction may also be other possible operation instructions, for example, a communication instruction configured to send the set object and information corresponding thereto to at least one external device and the like.

The embodiment of the present application is further described through the following application scenario.

Figure 2A:
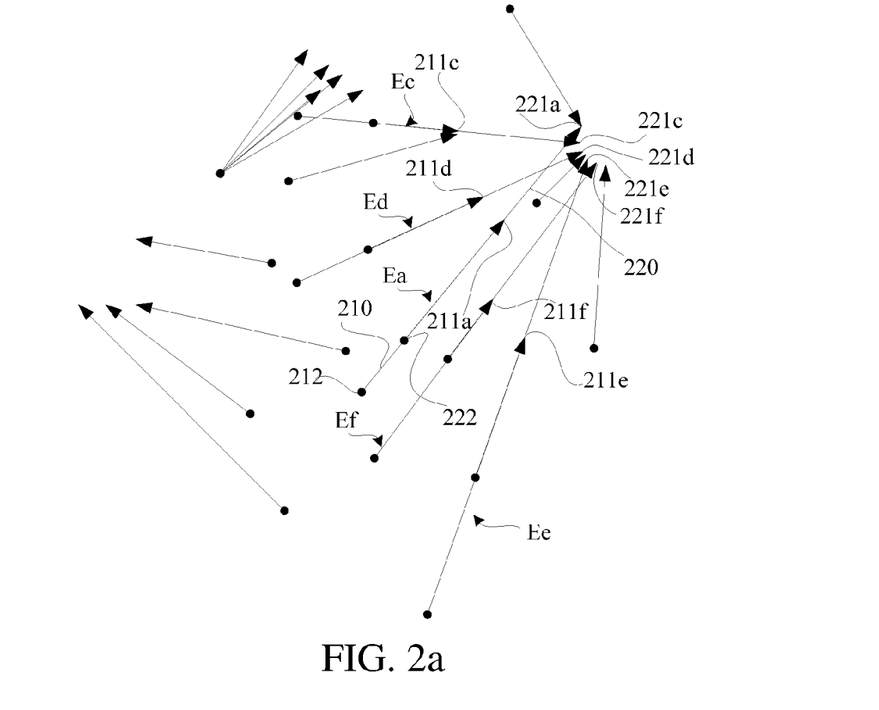
FIGS. 2a-2b are schematic diagrams of application scenarios of an information processing method according to an example embodiment of the present application.

In one possible scenario, sight line information corresponding to a space comprises multiple sight lines as shown in FIG. 2a, wherein each sight line is represented with an arrowed straight line; definitely, for readability of the drawing, FIG. 2a merely exemplarily illustrates some sight lines.

In the following description of the example embodiment, for a situation where a sight line direction has two gaze points distributed front and back, the former gaze point is in the back of starting points of the two gaze points, the former gaze point is referred to as first gaze point, the latter gaze point is referred to as second gaze point, and the sight line direction is referred to as a set sight line direction. In a situation where a sight line direction has a gaze point or has multiple gaze points not satisfying the above situation, the gaze point(s) is/are referred to as third gaze point.

In the example embodiment, according to the sight line information, it is obtained that in a first set sight line direction Ea, there are a first gaze point 211a and a second gaze point 221a distributed front and back along the first set sight line direction Ea, wherein the first gaze point 211a is a gaze point of a first sight line 210, the second gaze point 221a is a gaze point of a second sight line 220, and a first starting point 212 of the first sight line 210 and a second starting point 222 of the second sight line are both in a front side of the first gaze point 211a.

It can be seen from the above that, in the first set sight line direction Ea, there is a set object existing in a position corresponding to the first gaze point 211a.

Figure 2B:
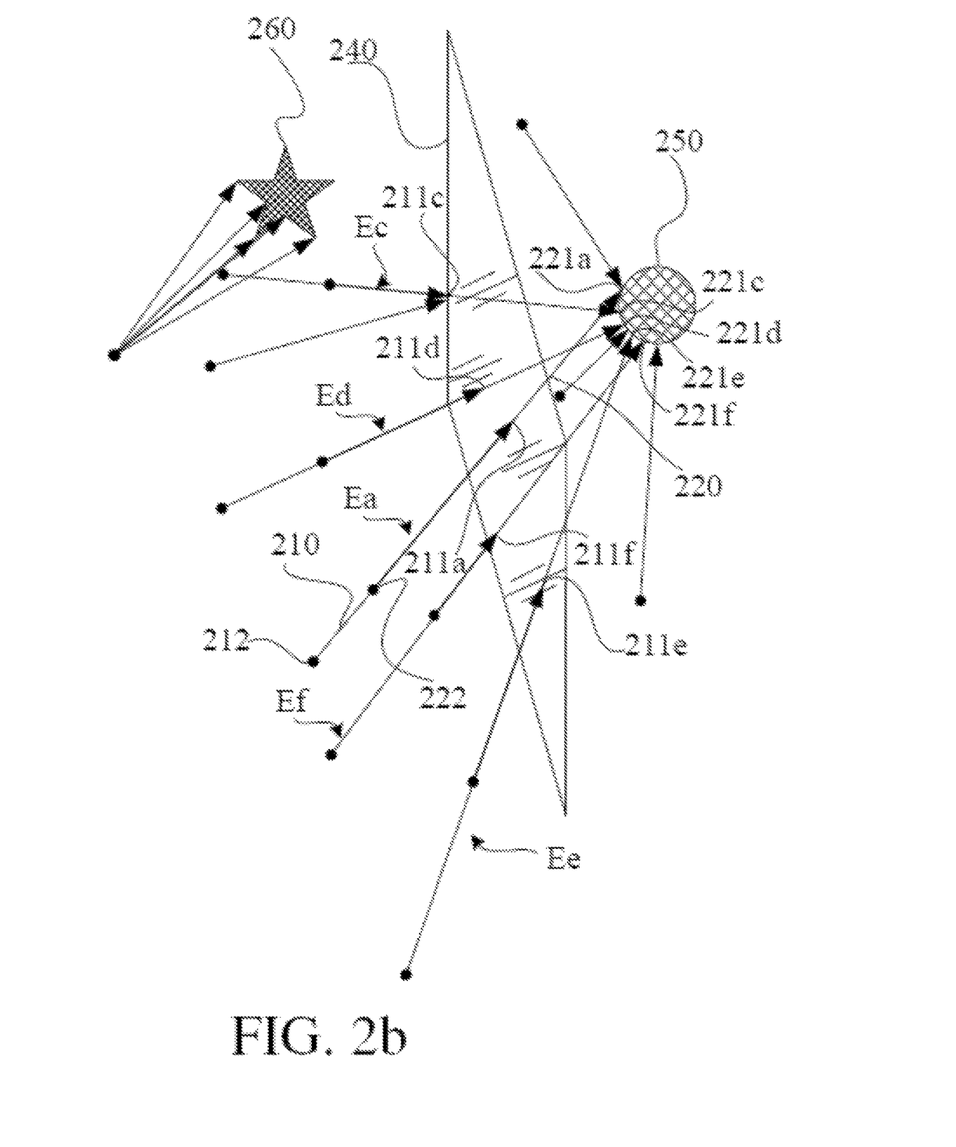

Further, in order to determine a region where the set object is, in the example embodiment, it is also feasible to find all sight line directions having a first gaze point and a second gaze point. In the example embodiment, as shown in FIG. 2a, several such set sight line directions are further exemplarily illustrated: a third set sight line direction Ec, a fourth set sight line direction Ed, a fifth set sight line direction Ef and a sixth set sight line direction Ef, which respectively correspond to multiple first gaze points 211c-211f and multiple second gaze points 221c-221f. A person skilled in the art can know that many other such set sight line directions are not illustrated in FIG. 2a. According to positions of the first gaze points 211a, 211c-211f in the all set sight line directions, it is feasible to determine the region where the set object 240 is, as shown in FIG. 2b (a person skilled in the art can know that, in order to obtain the region of the set object 240 in FIG. 2b, in addition to the first, third to sixth set sight line directions described as above, other set sight line directions corresponding to a first gaze point not illustrated are also used).

In the example embodiment, in addition to the set object 240, it is also feasible to determine positions of other objects according to the sight line information. For example, it is feasible to obtain, according to position information of all third gaze points in the sight line information, that a first object 250 and a second object 260 as shown in FIG. 2b are also present in the space.

After the set object 240 and the region corresponding thereto are determined, it is feasible to generate a modeling instruction, the set object 240 is modeled.

It should be understood by a person skilled in the art that, in any one of the foregoing methods of the specific implementations of the present application, the value of the serial number of each step described above does not mean an execution sequence, and the execution sequence of each step should be determined according to the function and internal logic thereof, and should not be any limitation to the implementation procedure of the specific example embodiments of the present application.

Figure 3:
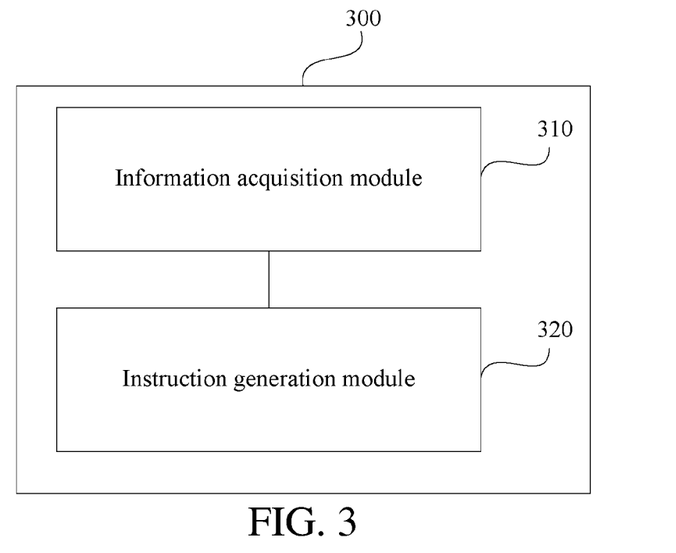
FIG. 3 is a schematic structural diagram of an information processing apparatus according to an example embodiment of the present application.

As shown in FIG. 3, an embodiment of the present application provides an information processing apparatus 300, comprising:

an information acquisition module 310, configured to acquire sight line information of at least one user in a space; and an instruction generation module 320, configured to, in response to a determination according to the sight line information that at least one set sight line direction exists, generate an operation instruction;

wherein each set sight line direction in the at least one set sight line direction has a first gaze point and a second gaze point distributed front and back, and two starting points of two sight lines respectively corresponding to the first gaze point and the second gaze point are both before the first gaze point.

When a user watches a transparent object or mirror object in a space, sight lines in one direction may fall on the object itself and may also fall behind the object. For the transparent object, the sight lines may fall on an object behind the transparent object, and for the mirror object, the sight lines may fall on an image of an object that a mirror plane of the mirror object faces. Therefore, by determining existence of such sight lines in the space, it is feasible to determine the transparent object or mirror object existing in the space, thus generating a corresponding operation instruction.

In the above example embodiment of the present application, it is easily detected according to at least one user's sight line information that a transparent object or a mirror object exists in a space, facilitating the user or a device to use the object detection result for subsequent operations, for example, it is possible to avoid hitting the transparent object or mirror object.

The embodiment of the present application is further described through the following example embodiment.

In some example embodiments, the sight line information comprises:

direction information, starting point position information and gaze point position information of multiple sight lines of the at least one user in the space. Reference can be made to the corresponding description in the embodiments shown in FIG. 1 and FIGS. 2a-2b for the description about the information.

In the embodiment of the present application, the at least one user may be one user, and may also be multiple users.

For example, in one example embodiment, optionally, the multiple sight lines may be:

multiple sight lines corresponding to objects existing in the space watched by a user multiple times in the space after one or more periods of time.

Alternatively, in one example embodiment, the multiple sight lines may be:

multiple sight lines corresponding to objects existing in the space watched by multiple users multiple times in the space after one or more periods of time.

In the embodiment of the present application, the more the number of the sight lines corresponding to the sight line information is, the more evenly the sight lines are distributed, and positions, shapes and the like of the at least one transparent object can be determined more accurately. In some example embodiments, as time goes on, the number of sight lines of the at least one user in the space may increase constantly, and thus the sight line information can be updated according to a set regularity. For example, the sight line information is updated constantly with a set cycle. In some example embodiments, an established model of the transparent object can be improved constantly through information corresponding to new sight lines.

In one example embodiment, the multiple sight lines may be captured when the at least one user watches each object in the space unconsciously. Alternatively, in one example embodiment, it is also feasible to indicate the at least one user to intentionally watch the corresponding object (for example, indicate the at least one user to watch the mirror object or transparent object existing in the space, especially a boundary position of the mirror object or transparent object), thus acquiring corresponding sight line information.

In some possible application scenarios, gaze point positions of one or more sight lines of the at least one user are not on a fixed object, for example, a moving object may appear in the space, the at least one user may watch the moving object, and thus in the embodiment of the present application, in order to avoid noise brought about by noise sight lines from which such an object is watched, it is feasible to first exclude the noise sight lines.

As presence of the moving object may be random or intermittent in the time, it is feasible to determine such noise sight lines according to acquisition time information of the multiple sight lines, for example, if sight lines of a gaze point in the region only appear in a region of the space in one time period, such sight lines may be the noise sight lines. Therefore, in one example embodiment, the sight line information further comprises:

acquisition time information of the multiple sight lines.

Figure 4A:
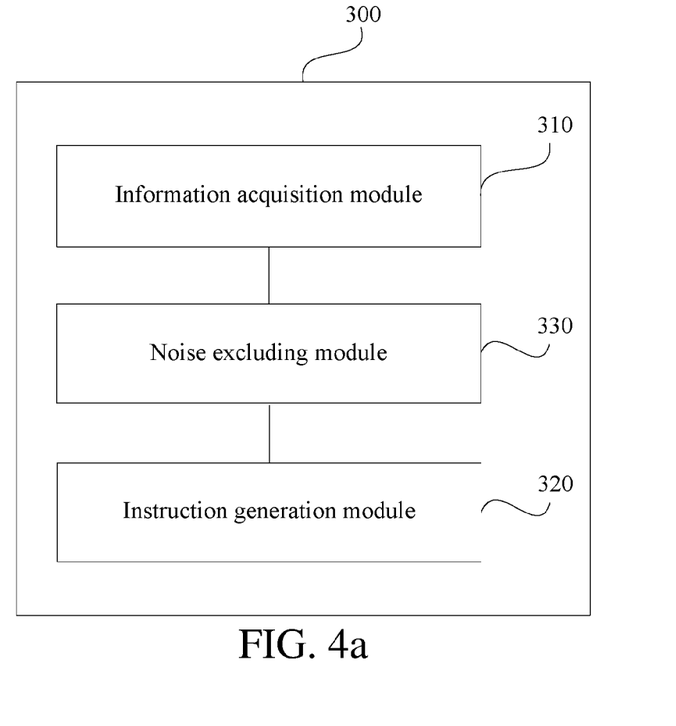
FIGS. 4a-4e are schematic structural diagrams of five information processing apparatuses according to an example embodiment of the present application.

As shown in FIG. 4a, in the example embodiment, the apparatus 300 further comprises:

a noise excluding module 330, configured to exclude, according to the acquisition time information, at least one noise sight line in the multiple sight lines.

The at least one noise sight line comprises: at least one sight line from which a moving object is watched.

In one example embodiment, the information acquisition module 310 may comprise multiple sensors, configured to capture the sight line information. The sensors, for example, may comprise a locator that locates the position of at least one user in a space, and a sight line tracking device that captures sight line directions of the at least one user and positions of gaze points relative to the user.

In another example embodiment, the information acquisition module 310 may comprise a communication device, configured to acquire the sight line information from at least one external device. The at least one external device, for example, may comprise a device that comprises the above multiple sensor, or may be at least one data server that collects the sight line information.

In one example embodiment, that the instruction generation module 320 determines, according to the sight line information, that the at least one set sight line direction exists, for example, may comprise:

determining, according to the sight line information, at least one set of sight lines, wherein each set of sight lines comprise two sight lines in the same sight line direction, gaze points of the two sight lines are distributed front and back, and starting points of the two sight lines are both in front of the gaze points; and a sight line direction corresponding to each set of sight lines is a set sight line direction.

In one example embodiment, only when two sight line directions of two sight lines are both completely the same as the sight line direction, can the first gaze point and the second gaze point be considered to be distributed front and back in the sight line direction; in other example embodiments, according to different precision requirements, it is also feasible to consider that the two sight line directions are the same as the sight line direction when the difference between the two sight line directions of the two sight lines and the sight line direction is within the set range, that is, the first gaze point and the second gaze point are in the sight line direction.

In the embodiment of the present application, front and back are relative to the sight line direction, for example, an upstream position in the sight line direction is before a downstream position in the sight line direction. In the embodiment of the present application, in the corresponding set sight line direction, the first gaze point is upstream of the second gaze point.

Figure 4B:
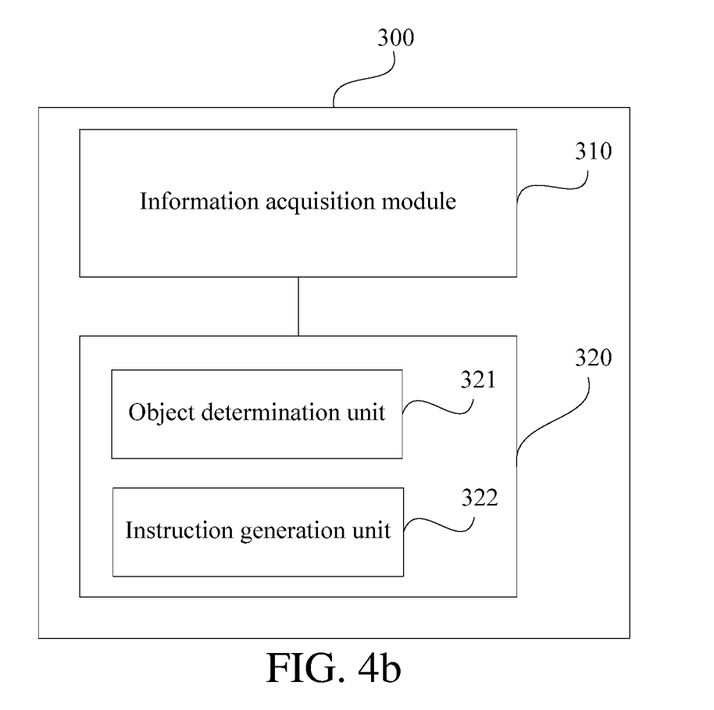

As shown in FIG. 4b, in one example embodiment, the instruction generation module 320 comprises:

an object determination unit 321, configured to, in response to a determination according to the sight line information that the at least one set sight line direction exists, determine that there is at least one set object existing in the at least one set sight line direction; and an instruction generation unit 322, configured to generate the operation instruction corresponding to the at least one set object;

wherein the at least one set object comprises: at least one transparent object and/or at least one mirror object.

When the at least one set sight line direction is a set sight line direction, it is possible to determine that the set sight line direction has a set object. When the at least one set sight line direction is multiple set sight line directions, the multiple set sight line directions may be sight line directions in which the same set object is gazed; and may also be sight line directions in which multiple set objects are gazed.

In some possible application scenarios, it is only necessary to know that a sight line direction has the set object, but it is unnecessary to know the position of the set object. For example, in one application scenario, after a sight line direction is determined, it is only necessary to warn the user, notify the user that the sight line direction has the set object, and remind the user to pay attention thereto.

In some other possible application scenarios, it may be necessary to further determine the position of the at least one set object, for example, the user or device is reminded how far from the current direction there is a set object, to facilitate the user or device to make preparations in advance. Therefore, in one example embodiment, the object determination unit 321 is further configured to:

determine the at least one set object exists in the position of at least one first gaze point corresponding to the at least one set sight line direction.

Figure 4C:
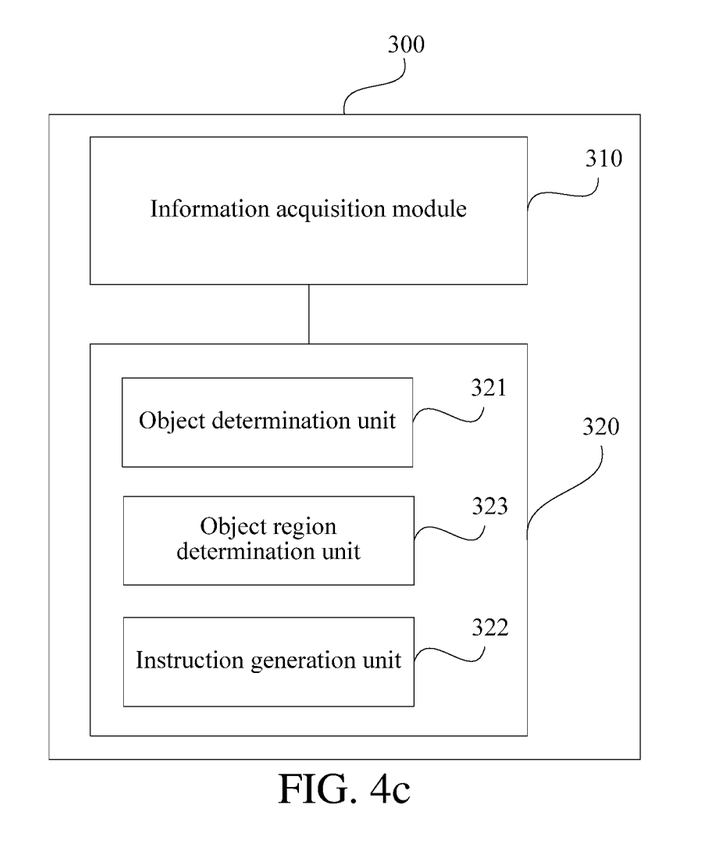

In one example embodiment, further, it is also feasible to determine, according to the sight line information, at least one region where the at least one set object is. In this way, it is feasible to provide more accurate information of the at least one set object for the user or device. For example, it is feasible to provide more information for modeling of the at least one set object. At this point, in the example embodiment, as shown in FIG. 4c, the instruction generation module 320 further comprises:

an object region determination unit 323, configured to determine, according to position distribution regularities of the at least one first gaze point, at least one region where the at least one set object is.

The instruction generation unit 322 may generate a corresponding operation instruction according to the at least one set object and the at least one region thereof.

In the example embodiment, the at least one first gaze point in the at least one set sight line direction correspondingly falls on the at least one set object, and thus it is feasible to determine, according to the position of the at least one first gaze point, the at least one region where the at least one set object is.

In one example embodiment, the operation instruction may comprise:

a warning instruction.

Figure 4D:
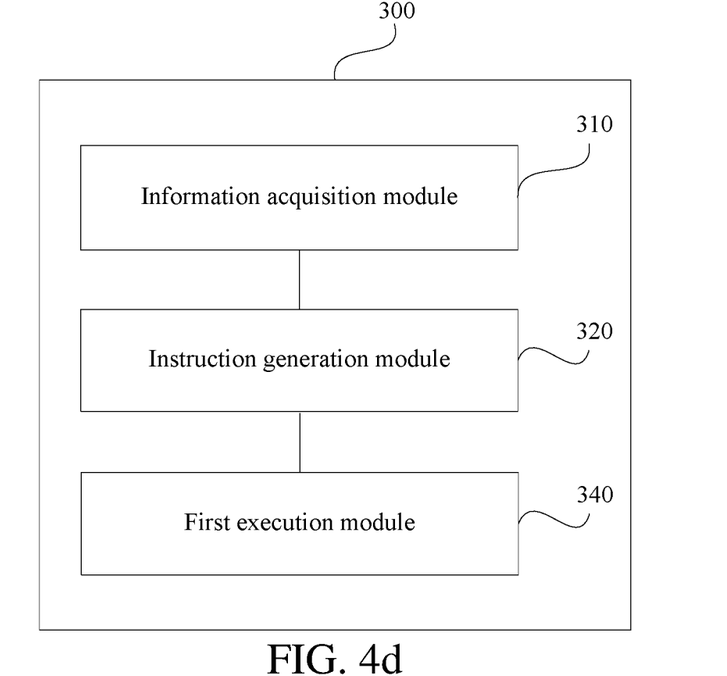

In the example embodiment, as shown in FIG. 4d, the apparatus 300 may further comprise:

a first execution module 340, configured to execute an operation according to the warning instruction.

In one example embodiment, the operation instruction may comprise:

a modeling instruction.

Figure 4E:
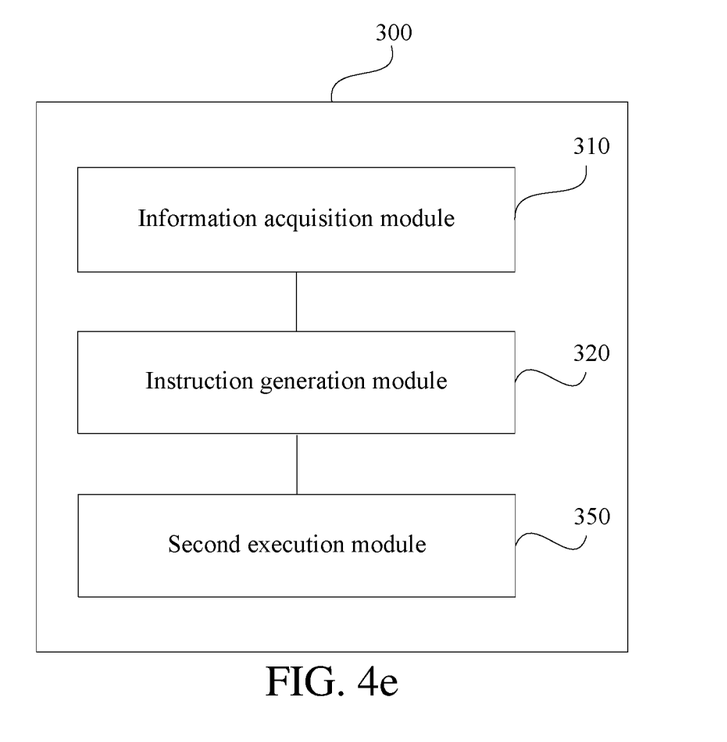

In the example embodiment, as shown in FIG. 4e, the apparatus 300 may further comprise:

a second execution module 350, configured to execute a modeling operation corresponding to the at least one set object according to the modeling instruction.

Reference can be made to the corresponding description in the above method embodiment for the further description about the implementation of the functions of the modules and units in the embodiment of the present application.

Figure 5:
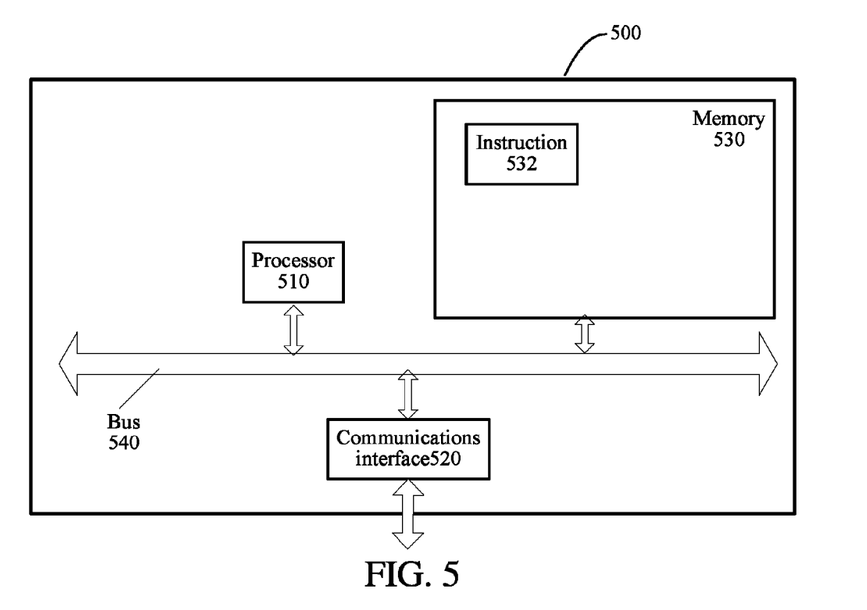
FIG. 5 is a schematic structural diagram of a user equipment according to an example embodiment of the present application.

FIG. 5 is a schematic structural diagram of a user equipment 500 according to an embodiment of the present application; the specific embodiment of the present application does not limit specific implementation of the user equipment 500. As shown in FIG. 5, the user equipment 500 may comprise:

a processor 510, a communications interface 520, a memory 530, and a communications bus 540.

The processor 510, the communications interface 520, and the memory 530 communicate with each other by using the communications bus 540.

The communications interface 520 is configured to communicate with a network element such as a client.

The processor 510 is configured to execute an instruction 532, and specifically, may implement relevant steps in the above method embodiments.

Specifically, the instruction 532 may comprise a computer operation instruction.

The processor 510 may be a central processing unit (CPU), or an application specific integrated circuit (ASIC), or one or more integrated circuits configured to implement the embodiments of the present application.

The memory 530 is configured to store the instruction 532. The memory 530 may comprise a high-speed random access memory (RAM), or may also comprise a non-volatile memory, for example, at least one magnetic disk memory. The instruction 532 may be specifically configured to enable the user equipment 500 to execute the following steps:

acquiring sight line information of at least one user in a space; and in response to a determination according to the sight line information that at least one set sight line direction exists, generating an operation instruction;

wherein each set sight line direction in the at least one set sight line direction has a first gaze point and a second gaze point distributed front and back, and two starting points of two sight lines respectively corresponding to the first gaze point and the second gaze point are both before the first gaze point.

For implementation of the steps in the instruction 532, reference may be made to corresponding description in the corresponding steps and units in the embodiments, and no further details are provided herein again. A person skilled in the art may clearly know that, for the purpose of convenient and brief description, for a detailed working process of the foregoing device and modules, reference may be made to a corresponding process in the foregoing method embodiments, and no further details are provided herein again.

A person of ordinary skill in the art may be aware that, with reference to the examples described in the embodiments disclosed in this specification, units and algorithm steps may be implemented by electronic hardware, or a combination of computer software and electronic hardware. Whether the functions are executed by hardware or software depends on particular applications and design constraint conditions of the technical solutions. A person skilled in the art may use different methods to implement the described functions for each particular application, but it should not be considered that the implementation goes beyond the scope of the present application.

When the functions are implemented in a form of a software functional unit and sold or used as an independent product, the functions may be stored in a computer-readable storage medium. Based on such an understanding, the technical solutions of the present application essentially, or the part contributing to the prior art, or a part of the technical solutions may be implemented in a form of a software product. The computer software product is stored in a storage medium, and comprises several instructions for instructing a computer device (which may be a personal computer, a server, a network device, or the like) to execute all or a part of the steps of the methods described in the embodiments of the present application. The foregoing storage medium comprises: any medium that can store program code, such as a USB flash drive, a removable hard disk, a read-only memory (ROM, Read-Only Memory), a RAM, a magnetic disk, or an optical disc.

The foregoing example embodiments are merely used for describing the present application, rather than limiting the present application. A person of ordinary skill in the art may made various changes and modifications without departing from the spirit and scope of the present application, and therefore, all equivalent technical solutions shall belong to the scope of the present application, and the protection scope of the present application shall be subject to the claims.

What is claimed is:

1. A method, comprising:

acquiring, by a system comprising a processor, sight line information of at least one user in a space;

in response to determining that the sight line information comprises at least one sight line direction, generating, by the processor, an operation instruction, wherein, in each sight line direction of the at least one sight line direction, there are a first gaze point and a second gaze point distributed in different positions, wherein the first gaze point is upstream of the second gaze point in the corresponding sight line direction, and wherein two starting points of two sight lines respectively corresponding to the first gaze point and the second gaze point are in front of the first gaze point in the corresponding sight line direction; and initiating performance of an operation based on the operation instruction, wherein the operation alters a device behavior corresponding to interaction with at least one object selected from a group of objects comprising a transparent object and a mirror object.

2. The method of claim 1, wherein the generating the operation instruction comprises:

in response to the determining that the sight line information comprises the at least one sight line direction, determining the presence of the least one object in the space based on the at least one sight line direction; and generating the operation instruction corresponding to the at least one object.

3. The method of claim 2, wherein the determining the presence of the at least one object comprises determining that the at least one object is present at the first gaze point or the second gaze point based on the at least one sight line direction.

4. The method of claim 3, further comprising determining at least one region based on the presence of the at least one object according to position distribution information determined from the at least one sight line direction.

5. The method of claim 1, wherein the operation instruction comprises a warning instruction.

6. The method of claim 5, further comprising executing an operation according to the warning instruction.

7. The method of claim 1, wherein the operation instruction comprises a modeling instruction.

8. The method of claim 7, further comprising executing a modeling operation corresponding to the at least one object according to the modeling instruction.

9. The method of claim 1, wherein the at least one user comprises multiple users.

10. The method of claim 9, wherein the sight line information comprises direction information, starting point position information and gaze point position information of multiple sight lines corresponding to the multiple users.

11. The method of claim 10, wherein the sight line information further comprises acquisition time information for a sight line of the multiple sight lines.

12. The method of claim 11, further comprising excluding, based on the acquisition time information, at least one noise sight line of the multiple sight lines.

13. The method of claim 12, wherein the at least one noise sight line corresponds to a moving object being watched by the at least one user.

14. An apparatus, comprising:
a memory that stores executable modules; and
a processor, coupled to the memory, that executes or facilitates execution of the executable modules, the executable modules comprising:
an information acquisition module configured to acquire sight line information of at least one user in a space; and
an instruction generation module configured to, in response to a determination that the sight line information comprises at least one sight line direction, generate an operation instruction facilitating alteration of a device behavior corresponding to interaction with at least one object selected from objects comprising one or more of a transparent object and a mirror object, wherein, in each sight line direction of the at least one sight line direction, there are a first gaze point and a second gaze point distributed in different positions, wherein the first gaze point is upstream of the second gaze point in the corresponding sight line direction, and wherein two starting points of two sight lines respectively corresponding to the first gaze point and the second gaze point are in front of the first gaze point in the corresponding sight line direction.

15. The apparatus of claim 14, wherein the instruction generation module comprises:
an object determination unit configured to, in response to the determination that the sight line information comprises the at least one sight line direction, determine the presence of the at least one object in the space based on the at least one sight line direction; and
an instruction generation unit configured to generate the operation instruction corresponding to the at least one object.

16. The apparatus of claim 14, wherein the instruction generation module comprises an object determination unit configured to determine a position of the least one object based on the first gaze point.

17. The apparatus of claim 14, wherein the instruction generation module comprises an object region determination unit configured to determine at least one region of the space comprising the at least one object based on position distribution regularities corresponding to the first gaze point.

18. The apparatus of claim 14, wherein the operation instruction comprises a warning instruction.

19. The apparatus of claim 18, wherein the execution module is configured to execute the operation according to the warning instruction.

20. The apparatus of claim 14, wherein the operation instruction comprises a modeling instruction facilitating modeling of the at least one object of the space based on the sight line information.

21. The apparatus of claim 20, wherein the execution module is configured to execute a modeling operation corresponding to the at least one object according to the modeling instruction.

22. The apparatus of claim 14, wherein the sight line information of the at least one user is sight line information of multiple users, comprising the user.

23. The apparatus of claim 14, wherein the sight line information comprises direction information, starting point position information and gaze point position information of multiple sight lines of the user in the space.

24. The apparatus of claim 23, wherein the sight line information further comprises acquisition time information of a sight line of the multiple sight lines.

25. The apparatus of claim 24, wherein the executable modules further comprise a noise excluding module configured to exclude, according to the acquisition time information, at least one noise sight line of the multiple sight lines.

26. The apparatus of claim 25, wherein the at least one noise sight line comprises a sight line corresponding to a moving object.

27. A user equipment, comprising:
a memory configured to store at least one instruction;
a processor configured to execute the at least one instruction stored in the memory, the at least one instruction causing the processor to execute operations, comprising:
acquiring sight line information of at least one user in a space; and
in response to a determination that the sight line information comprises at least one sight line direction, generating an operation instruction, wherein a corresponding operation alters a behavior of a device, wherein the behavior corresponds to interaction between the device and an object selected from a group of objects comprising a transparent object and a mirror object, wherein, in each sight line direction of the at least one sight line direction, there are a first gaze point and a second gaze point distributed in different positions, wherein the first gaze point is upstream of the second gaze point in the corresponding sight line direction, and two starting points of two sight lines respectively corresponding to the first gaze point and the second gaze point are in front of the first gaze point in the corresponding sight line direction; and
causing an operation to be performed, wherein the operation corresponds to the operation instruction.

* * * * *